April 21, 1959 — N. PERLAKI — 2,883,214
STUFFING-BOX ASSEMBLY HAVING A LIQUID SEAL
Filed Feb. 20, 1957
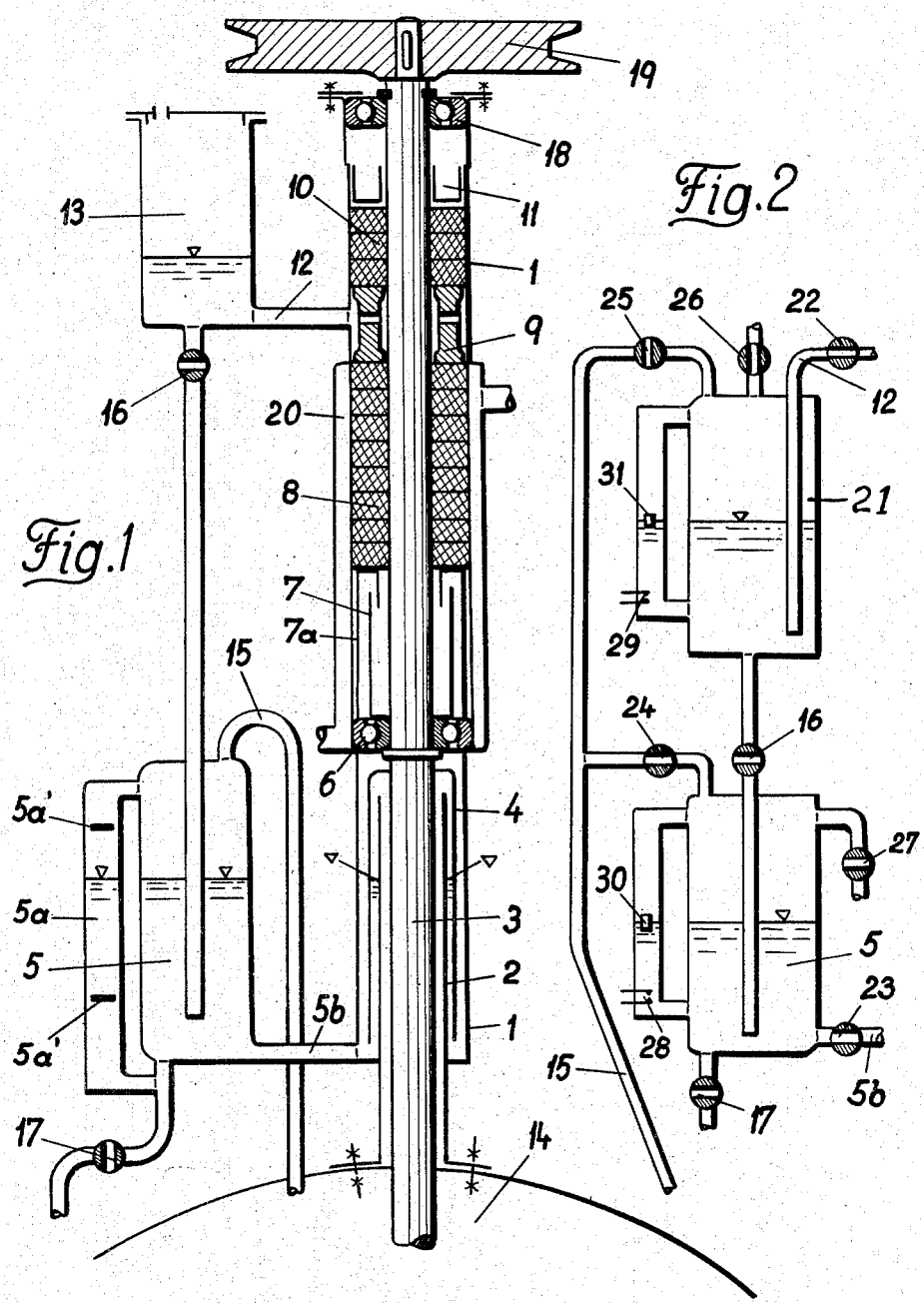

United States Patent Office 2,883,214
Patented Apr. 21, 1959

2,883,214

STUFFING-BOX ASSEMBLY HAVING A LIQUID SEAL

Nandor Perlaki, Ried, Innkreis, Austria, assignor of fifteen percent to Istvan Varsa, Bridgeport, Conn.

Application February 20, 1957, Serial No. 641,394

4 Claims. (Cl. 286—19)

This invention relates to a stuffing-box assembly having a liquid seal and intended for sealing a shaft in a vessel in which a pressure different from atmospheric pressure prevails, particularly in chemical apparatus which operates alternatively under a high pressure and a vacuum.

The invention provides a stuffing-box assembly which comprises a packing for receiving said shaft, a sealing cage for receiving said shaft, two containers adapted to hold a sealing liquid, means for subjecting one of said containers to the pressure in said vessel and the other one to a different pressure, and a stuffing-box housing containing said packing and seal cage and connected to both said containers and providing a flow path extending between said two containers past said seal cage and between said packing and shaft when the same is received in said packing, whereby said sealing liquid is adapted to flow along said flow path from that of said containers which is under a relatively higher pressure to that of said containers which is under a relatively lower pressure.

The previously known stuffing-boxes having a liquid seal have the disadvantage that the sealed shaft is running without lubrication and a centric guidance of the sealed shaft section by the incorporation of a bearing is not possible. According to the invention this disadvantage is eliminated in that the sealing liquid which forms the content of the liquid seal serves at the same time as a lubricant which is kept flowing by means of the high pressure or vacuum prevailing in the apparatus or vessel. This continuous lubrication enables the arrangement of two bearings for the shaft section to be sealed. In continuous operation of the apparatus it is even possible to collect the sealing liquid flowing through the stuffing-box in a cell and to return the liquid through an appropriate valve system to the liquid seal during operation.

The invention is illustrated diagrammatically and by way of example in the accompanying drawing, in which:

Fig. 1 is a view for periodically operating apparatus, where the sealing liquid is returned to the liquid seal during an inoperative period.

Fig. 2 shows a system of cells and valves for stuffing-boxes for continuously operated apparatus, whereby the sealing liquid can be returned to the liquid seal also during the operation.

The shaft 3 to be sealed, on which the sealing cage 4 is airtightly mounted, rotates in the stuffing-box casing 1, which communicates through the pipe 5b with the pressure cell 5 and the liquid level indicator 5a and which is integral with a conduit means in the form of the pipe connection 2 affixed to the vessel 14. The level of the sealing liquid is the same in the pressure cell 5, in the liquid level indicator 5a and in the space between the pipe connection 2 and the seal cage 4 and is under the pressure prevailing in the apparatus or vessel 14. Due to this pressure the sealing liquid rises between the cage 4 and the casing 1. New sealing liquid is continuously being fed from the pressure cell 5. The sealing liquid is non-reactive with regard to the reaction taking place in the vessel and suitable for lubricating the stuffing-box. In the case of water-soluble reactions, oil or silicone oil may be employed, e.g. In the case of oil-soluble reactions, glycerine or glycol is recommendable. The sealing liquid rising in the stuffing-box lubricates the bearing 6 on which the spacer 7a bears, against which the packing rings 8, the scraper ring 9 and the packing rings 10 are urged by the gland 11 screwed into the top part of the stuffing-box. When the sealing liquid rises under the action of the pressure in the apparatus it will lubricate also the packing rings 8, whereby it suffers a pressure drop. Then it is collected by the scraper ring 9 and is conducted by the pipe 12 into the vented collecting cup 13. During operation the two valves 16, 17 are closed. The packing rings 10 ensure that the sealing liquid can collect only in the vessel 13, not in the casing 1. During operation the level drops in the pressure cell 5 and in the liquid level indicator 5a between the two limiting levels 5a' indicated whereas there is a rise in the level in the cup 13. Since the packing rings 8 resist the flow of liquid the liquid can flow through the stuffing-box continuously but only in a seeping and trickling manner.

During a shut-down period, when the apparatus 14 is opened, the liquid collected in the cup 13 is permitted to drain through the valve 16 into the pressure cell 5, which is vented through the pressure pipe 15. No special manipulation is required to shift the apparatus from high-pressure to vacuum operation because the direction of flow of the sealing liquid will be automatically reversed responsive to the action of the outside pressure. In that case the sealing liquid will trickle from the cup 13 to the pressure cell 5 (now a vacuum cell). In that case the cage 7 rotating with the shaft 3 serves as a mudguard arranged in front of the bearing 6. If the stuffing-box is to operate permanently against a vacuum the liquid shown in the lower part of the pressure cell 5 must be drained in shutdown periods through the cock 17 and be poured into the cup 13. The upper bearing 18 and the lower bearing 6 ensure the centric guidance of the shaft section to be sealed. The V-belt pulley 19 represents only by way of example a drive element. The casing 1 and with it the bearing 6 may be cooled, if necessary, by means of the cooler 20.

If it is desired to use the stuffing-box in continuous operation the cup 13 must be replaced by a pressure cell 21 which is similar to the pressure cell 5. In that case the pipe 12 is arranged to extend into the pressure cell 21 close to the bottom thereof. The pipe connections 12 and 5b can be closed by the valves 22, 23, respectively. The pressure pipe 15 communicates through the valve 24 with the pressure cell 5 and through the valve 25 with the pressure cell 21. The pressure cell 21 can be vented through valve 26. The pressure cell 5 can be vented through the valve 27.

The function of this stuffing-box suitable for continuous operation is as follows: In the operative position of the valve system the valves 16, 17, 25, 27 are closed and the valves 22, 23, 24, 26 open. The pressure in the pressure cell 5 causes the flow in the direction described hereinbefore. This results in a drop of the liquid level in the pressure cell 5 and a rise of said level in the pressure cell 21, which is vented through the valve 26 to a gasometer (not shown). After a change-over to vacuum operation the valves remain in the aforesaid operative position. The direction of flow of the sealing liquid will be automatically reversed, the sealing liquid rising under the action of the gasometer pressure and of the vacuum in the apparatus 14 through the pipe 12. The liquid level will then drop in the pressure cell 21 and rise in the pressure cell 5. When the sealing liquid is to be returned all valves excepting the closed drain valve 17 are reversed, valves 22, 23, 24, 25 being closed and valves 16, 25, 27 being opened. In this case the action of the pressure acting from the apparatus 14 will cause the liquid to subside from the pressure cell 21 to the pressure cell 5, which is vented through the valve 27 into the gasometer. When the apparatus operates under a vacuum the liquid will rise in the same position of the valves. Under the gasometer pressure acting through the valve 27 or the vacuum acting through the valve 25 the liquid rises from the pressure cell 5 into the pressure cell 21. After the liquid has been returned the valves are returned to the aforementioned operating position. The shifting of the valves may be effected fully automatically, e.g. by built-in contacts 28, 29 cooperating with floats 30, 31.

When the seal 8 becomes loose or is thrown out during operation the gaseous content of the vessel cannot escape through the stuffing-box; only the velocity of flow will be increased.

I claim:

1. A stuffing-box assembly having a liquid seal and intended for sealing a shaft in a vessel in which a pressure different from atmospheric pressure prevails, said stuffing-box assembly comprising a packing for receiving said shaft, a sealing cage airtightly mounted on said shaft, two containers adapted to hold a sealing liquid, means for subjecting one of said containers to the pressure in said vessel and the other one to a different pressure, and a stuffing-box housing containing said packing and seal cage and connected to both said containers and providing a flow path extending between said two containers past said seal cage and between said packing and shaft when the same is received in said packing, whereby said sealing liquid is adapted to flow along said flow path from that of said containers which is under a relatively higher pressure to that of said containers which is under a relatively lower pressure.

2. A stuffing-box assembly as set forth in claim 1 in which said casing contains at least one bearing adapted to receive said shaft and arranged in said flow path.

3. A stuffing-box assembly having a liquid seal and intended for sealing a shaft in a vessel in which a pressure different from atmospheric pressure prevails, said stuffing-box assembly comprising a packing for receiving said shaft, a sealing cage airtightly mounted on said shaft, two containers adapted to hold a sealing liquid, valve means connected to said containers and operable between two positions, in one of which one of said containers is arranged to be subjected to the pressure in said vessel and the other of said containers is arranged to be subjected to a pressure differing from that in said vessel, whereas in the other of said two positions said other container is arranged to be subjected to the pressure in said vessel and said one container is arranged to be subjected to said pressure differing from that in said vessel, and a stuffing-box housing containing said packing and seal cage and connected to both said containers and providing a flow path extending between said two containers past said seal cage and between said packing and shaft when the same is received in said packing, whereby said sealing liquid is adapted to flow along said flow path from that of said containers which is under a relatively higher pressure to that of said containers which is under a relatively lower pressure, and the direction of flow of said sealing liquid can be reversed by operation of said valve means from one of said positions to the other.

4. A stuffing box assembly for a shaft extending upwardly from a vessel, said assembly comprising a stuffing box housing adapted to receiving a portion of said shaft disposed above the vessel, packing means disposed within the housing and adapted to receive a portion of the shaft disposed within the housing, conduit means defining an annular space along the shaft communicating with the inside of the vessel and the inside of the stuffing box, said conduit means terminating inside the stuffing box below said packing means, a sealing cage disposed within the housing, said sealing cage being in airtight engagement with the shaft intermediate the upper end of the conduit means and the packing means and extending coaxially along the shaft in spaced relationship with the conduit means and the housing, a container disposed without the stuffing box alongside the sealing cage, pipe means communicating with the container at a level below the level of the conduit means upper end and with the stuffing box housing at a level below the level of the conduit means upper end, whereby when liquid is placed in the container and the container is vented to the pressure within the vessel and the packing on the upper side thereof is exposed to a pressure different from the pressure within the vessel, a flow path between the container and the upper side of the packing is established and a liquid seal is formed between the vessel and said flow path in the space intermediate the sealing cage and the conduit means.

References Cited in the file of this patent
UNITED STATES PATENTS 1,600,149    Surjaninoff _____ Sept. 14, 1926

FOREIGN PATENTS 499,087    Canada _____ Jan. 5, 1954